United States Patent

[11] 3,604,557

[72] Inventor Nicholas J. Cedrone
40 Bear Hill Rd., Waltham, Mass. 02154

[21] Appl. No. 844,390
[22] Filed July 24, 1969
[45] Patented Sept. 14, 1971

[54] CARRIER
3 Claims, 5 Drawing Figs.

[52] U.S. Cl. .......... 206/1 R, 206/46 H, 206/46 R, 206/56 AC
[51] Int. Cl. .......... A45c 11/00, B65d 85/00
[50] Field of Search .......... 206/1, 46 M, 65 F, 56 M, 56 A, 72, 59 M, 46 H; 294/33, 99

[56] References Cited

UNITED STATES PATENTS

| | | | |
|---|---|---|---|
| 2,670,584 | 3/1954 | Rood, Jr. et al. | 206/79 UX |
| 3,031,311 | 4/1962 | Nakagawa | 206/72 X |
| 3,048,268 | 8/1962 | Rocchi et al. | 206/59 (M) X |
| D.199,765 | 12/1964 | Weiss | 206/65 (F) X |
| 3,307,437 | 3/1967 | Sontag | 294/33 X |
| 3,407,925 | 10/1968 | Ruehlemann | 206/65 (F) |
| 3,417,865 | 12/1968 | Suverkropp et al. | 206/72 X |

*Primary Examiner*—Joseph R. Leclair
*Assistant Examiner*—Steven E. Lipman
*Attorney*—Kenway, Jenney and Hildreth

ABSTRACT: A carrier for small objects comprises a four-sided member forming a distortable parallelogram. Brackets extending from two opposed arms remain substantially parallel during this distortion, whereby they may be moved apart for receiving or releasing an object, and resiliently urged together to hold the object.

INVENTOR.
NICHOLAS J. CEDRONE
BY Kenway, Jenney & Hildreth
ATTORNEYS

CARRIER

BACKGROUND OF THE INVENTION

This invention relates generally to carriers, also called "holders," adapted to hold small objects for protection, processing, testing and other handling. More particularly, it concerns reusable carriers of the type providing quick reception and release with accurate alignment of the object and good access for processing and testing while mounted in the carrier.

Carriers of this kind are particularly useful in the manufacture of electrical circuit components such as printed circuits potted in the form of wafers, rectangular solids or the like, hereinafter referred to simply as "wafers." These wafers have one or more rows of metal strips or leads extending from one or more sides for making circuit connections. Typically, there are two rows of leads, one extending from each of two opposed edges or sides of the wafer. These leads may extend in a common plane or may extend in parallel planes as in the well-known dual in-line configuration.

Wafers mounted in carriers are processed in several ways before they are finally assembled into end products. Such processing includes symbolizing, that is marking with alphanumeric signs or the like, and testing by attachment of test instruments to selected leads and measuring circuit performance characteristics.

The carriers hitherto employed have been somewhat unsatisfactory for one or more reasons. One form has two mating parts that snap together around the wafer with apertures for access to the leads and wafer surfaces. This form provides only limited access for symbolizing and is expensive to manufacture. Other forms comprise structures with one or more resilient retaining parts such as tabs, flanges, fingers, nibs or parts having like functions. These parts are typically formed of resilient plastic material and are distorted to clasp and embrace the edges, sides or covers of the wafer in a resilient manner. Aside from the expense of these forms, they have severe limitations resulting from the limited distortion of which such parts are capable before they break, snap off or become permanently set and thus inoperative or of uncertain or reduced holding effectiveness.

SUMMARY OF THE INVENTION

This invention overcomes the foregoing disadvantages by employing the properties of a distortable parallelogram whereby its sides remain parallel and undergo mutual lateral and longitudinal displacement as the figure is distorted. By extending retaining brackets from a pair of opposed arms forming the sides, it is possible to cause these brackets to partake of this longitudinal relative displacement and to move toward or away from one another upon distortion of the figure. This permits substantial relative movement of the opposed brackets before permissible stress limits in the material are reached, thereby facilitating use, improving reliability and reducing replacement costs.

Structures according to this invention may be formed as unitary molded or extruded plastic bodies providing the needed retaining force to hold the small objects firmly and resiliently in place. These structures may embody various useful features and adaptations according to the forms of the objects to be retained. For example, the brackets may be grooved to receive the leads of a wafer, and they may have slots, rabbets, lips or other retaining or aligning means that are not required to be distorted independently of the distortion in the parallelogram itself to render the device effective.

DETAILED DESCRIPTION OF THE INVENTION

Figure 1:
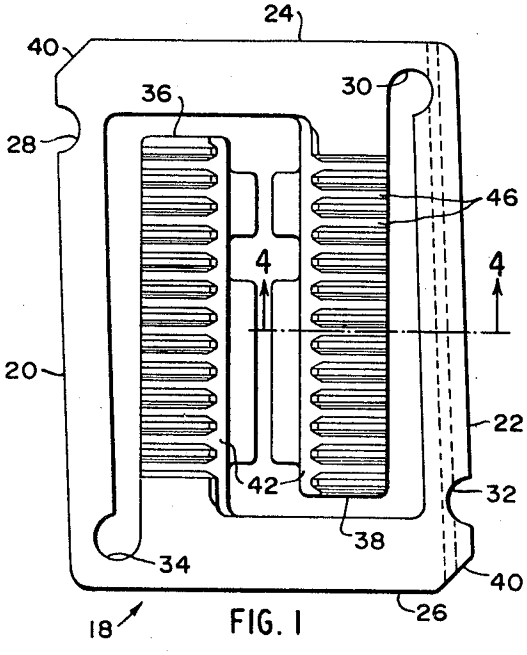
FIG. 1 is a plan view of a preferred embodiment of the invention in its relaxed condition.

A typical wafer 10 has a body 12 of insulating material encapsulating a component electrical circuit, the circuit being connected with a plurality of spaced electrical leads 14 usually formed from a thin sheet of metal. The leads may be numbered by suitable indicia printed on the body, and the body may also bear other indicia identifying the encapsulated circuit. The indicia are collectively identified by the reference numeral 16.

The preferred form of handling carrier for the wafer, according to this invention, is a unitary body 18 of electrically insulating plastic material which, in the relaxed state, has the configuration shown in FIG. 1. Preferably, the body is molded, although other methods of fabrication maybe used such as stamping, extruding, sawing into separate retainers and cutting or pressure forming of the parts under applied heat. The material selected should be resilient, polypropylene being preferred, although there are many other suitable materials such as epoxies, natural or synthetic rubbers and other elastomers. Metals can also be used where provision is made to insulate the leads 14 mutually, or where the objects are being retained or grasped at surfaces thereof that permit the electrically conductive portions to remain out of contact with the body of the carrier.

The principal portions of the body 18 comprise four arms 20, 22, 24 and 26 forming the sides of a parallelogram of nearly rectangular form. Each of the arms is substantially rigid under conditions of use, and the arms are effectively pivoted at their ends to render the parallelogram resiliently distortable. In the illustrated embodiment this is accomplished by reduction of the cross section at partial bore holes 28, 30, 32 and 34 to create preferential sites for localized distortion at or near the points of juncture of the respective arms. In use, substantially all of the distortion or strain of the parts of the body 18 occurs at these sites, and for this reason the diameters of the holes are sufficiently large to minimize the resulting stress concentrations in a manner analogous to fillets.

Extending inwardly from the arms 24 and 26 at right angles thereto are two brackets 36 and 38 for holding the wafer as described below. The angle formed between each bracket and the arm from which it extends does not vary appreciably under conditions of use.

Figure 2:
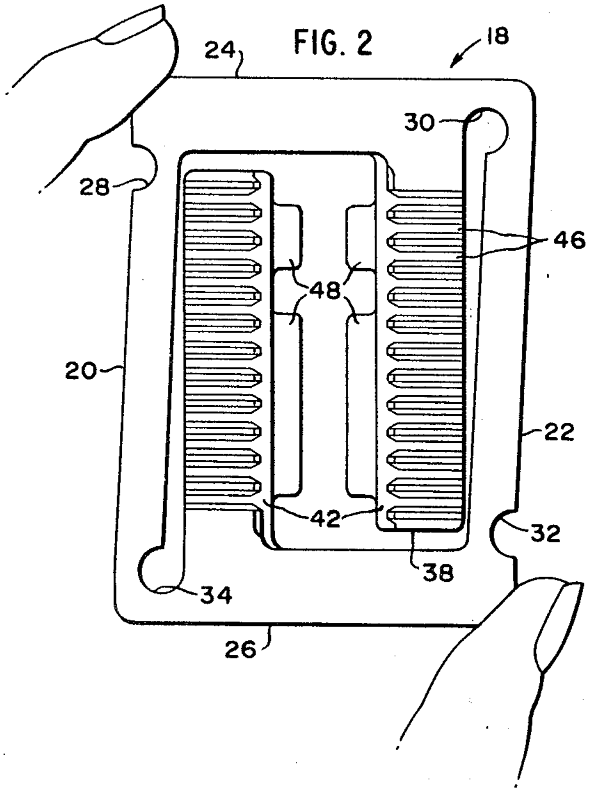
FIG. 2 is a view illustrating the manual distortion of the retainer of FIG. 1 to receive or release a wafer.

It will be observed that the lateral distance between the mutually facing sides of the brackets varies as the longitudinal relative displacement of the arms 24 and 26 when the body 18 is distorted as viewed in FIG. 2. This is preferably done by manually or mechanically pressing the two opposite corners conveniently marked by flats 40 toward one another, thereby shifting the arm 24 bearing the bracket 38 toward the right relative to the arm 26 bearing the bracket 36.

The brackets 36 and 38 also move longitudinally relative to one another but this movement is small and of no substantial significance. It is proportional to the product of the length of the sides 20 and 22, which may be held to a minimum, and the cosine of the small angle displaced by the sides 20 and 22 relative to the sides 24 and 26 during this movement.

Figure 3:
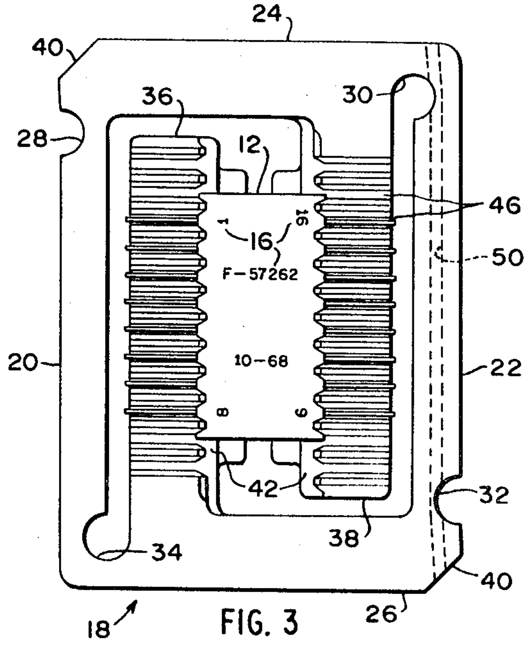
FIG. 3 is a plan view of the carrier clasping a wafer after removal of the manual distorting force.

While the carrier is being held in the distorted position of FIG. 2 the wafer 10 may be placed between the brackets 36 and 38. With the wafer in position the carrier may be released to permit the brackets to clasp the sides of the body 12 and hold it resiliently in the position shown in FIG. 3. Preferably, the dimensions are such that the sides of the carrier are under sufficient stress to form a rectangle when the wafer is in place, although this is an optional feature.

Figure 4:
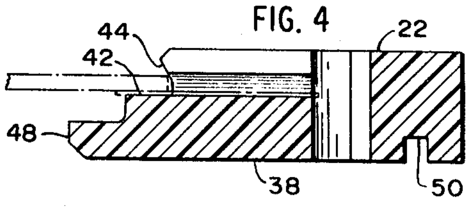
FIG. 4 is a fragmentary elevation in section taken on line 4—4 of FIG. 1 showing details of the bracket configuration.
Figure 5:
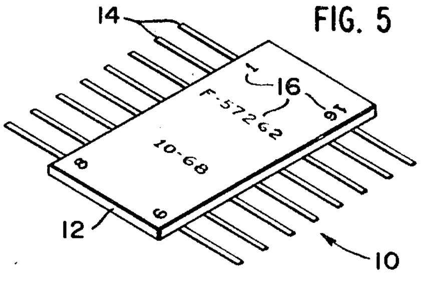
FIG. 5 is a view in perspective of a flat wafer illustrating one of the common types which this invention is adapted to retain.

To facilitate the clasping of the wafer the brackets may have various adaptations. These vary with the shape of the object being retained. In the illustrated embodiment each bracket has a rabbet 42 for receiving and underlying an edge of the wafer. A side 44 of the rabbet is undercut or notched as shown in FIG. 4, thereby effectively locking the wafer in position and preventing its frictional dislodgement except when accompanied by distortion of the parallelogram. A number of grooves 46 are formed transversely of each bracket to receive the leads 14. Chamfers, fillets and other features are included in accordance with usual practice. Preferably, the brackets also have projections 48 (FIG. 2) to prevent excessive distortion of the carrier in one direction while the arms 20 and 22 limit the distortion in the other direction by striking the free ends of the brackets.

The underside of the carrier may be flat if desired, or it may include a groove 50 or other features used for mechanical handling of the carrier in use.

It will be apparent that one side of the wafer is substantially entirely exposed for access to the surface of the body 12 for symbolizing, and to the leads 14 for testing purposes. To release the wafer it is merely necessary to reverse the foregoing steps by manually or mechanically pressing the corners 40 as in FIG. 2, and allowing the wafer to fall out by gravity or pushing it out from the underside of the carrier.

An outstanding advantage of this invention resides in the substantial relative movement that may be effected between the brackets without exceeding the stress limits of the material. The magnitude of this movement may be a substantial fraction of the dimensions of the wafer or object retained, for example 10 per cent or more of the distance between the sides from which the leads 14 extend.

Variations in the structure of the carrier will occur to those skilled in the art. For example, the hinge points can be weakened and provided with springs, or the arms may be separate parts linked with springs. For retaining wafers of the dual in-line configuration the grooves 46 may be replaced by grooves at right angles thereto in the projections 48 and rabbets 42. Other variations and modifications will occur to those skilled in the art without departure from the spirit or scope of the invention.

I claim:

1. A carrier to receive a wafer having leads extending outwardly therefrom, comprising a distortable four-sided frame shape, the frame being distortable into a parallelogram by pressure applied at diagonally opposite corners, brackets extending inwardly from two opposite sides of the frame near the two other diagonally opposite corners, the two brackets being parallel and upon distortion of the frame shifting laterally with respect to each other to enlarge the space between them while substantially maintaining their parallel relationship and with only slight longitudinal movement relative to one another, the brackets having portions to engage and hold the wafer upon release of the pressure applied at the corners.

2. A carrier according to claim 1 in which the brackets have grooves to receive the leads of the wafer.

3. A carrier according to claim 1, in which the brackets have rabbeted edges mutually opposed for receiving said wafer.